(No Model.)
F. SANITER.
Tub or Receptacle for Plants.
No. 243,307. Patented June 21, 1881.
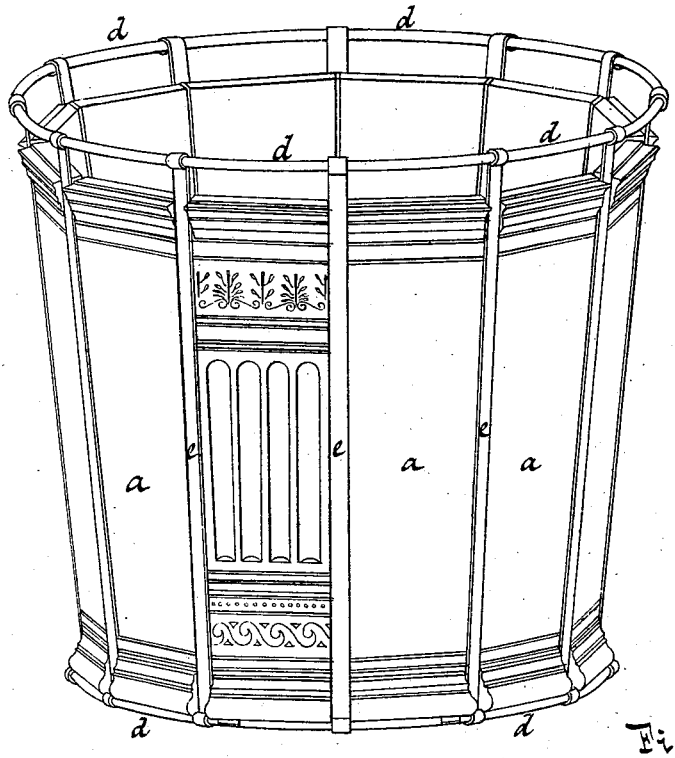
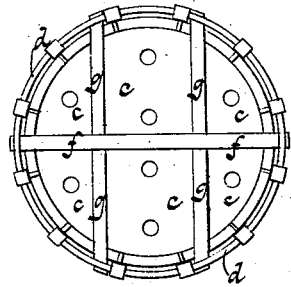
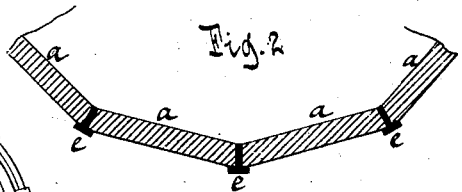
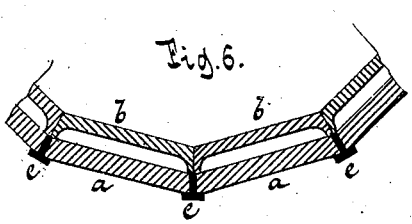
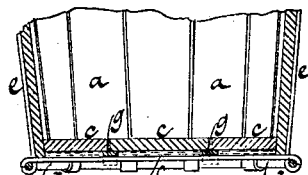
Inventor
Frederick Sanjter
by Van Santvoord & Hauff
his att'ys.
Witnesses
Otto Aufdaud
William Miller

UNITED STATES PATENT OFFICE.

FREDERICK SANITER, OF ROSTOCK, MECKLENBURG-SCHWERIN, GERMANY.

TUB OR RECEPTACLE FOR PLANTS.

SPECIFICATION forming part of Letters Patent No. 243,307, dated June 21, 1881.

Application filed May 11, 1881. (No model.)

*To all whom it may concern:*

Be it known that I, FREDERICK SANITER, residing at the city of Rostock, in the Grand Duchy of Mecklenburg-Schwerin, German Empire, have invented new and useful Improvements in Tubs or Receptacles for Plants, of which the following is a specification.

This invention relates to a receptacle for plants, flowers, and the like, the sides and bottom of the same being formed of stone plates or tiles, and provided with ribs or hoops, of metal or other suitable material, for holding said plates or tiles in place, as hereinafter more fully set forth.

The sides and bottom of the receptacle, instead of being formed of a single series of plates or tiles, may be formed of a double series placed one within the other, with an air-space left between, as hereinafter described.

This invention is illustrated in the accompanying drawings, in which Figure 1 is a perspective view of my receptacle. Fig. 2 is a transverse section of part of the same. Fig. 3 is a detached view of a rib. Fig. 4 is an inverted plan view of one of my receptacles. Fig. 5 is a vertical central section of the same, partly broken away. Fig. 6 is a transverse section, showing the sides of the receptacle formed of a double series of plates or tiles.

Similar letters indicate corresponding parts.

The sides of the receptacle consist of tiles or plates $a\ a$, of stone, cement, or other suitable material. These tiles or plates lie between ribs $e$, of T-iron, by which they are held in place. The joints are made air-tight by any suitable cement. The upper and lower ends of the ribs $e$ clasp hoops $d$, by which they are held in place.

As shown in Fig. 1, the upper hoop $d$ is raised some distance above the upper edge of the receptacle, so as to form a handle by which the receptacle can be raised and carried; or, if desired, a chain may be attached to said upper hoop and the receptacle suspended.

The bottom of the receptacle, Fig. 4, is also composed of plates or tiles of stone or cement, $c$, held in place by ribs $g$, of T-iron, the ends of which ribs clasp the lower hoop $d$. An additional brace, $f$, Figs. 4 and 5, may be provided to strengthen the bottom. The lower tiles, $c$, are preferably perforated, as shown, to allow the water to flow off.

As shown in Fig. 6, the sides of the receptacle may be made of a double series of tiles, $a\ b$, placed one within the other, and having an air-space between them. The result is that the roots of plants contained in the receptacle are not exposed to any sudden changes of temperature. The bottom of the receptacle may also be made double, if desired.

When the plants are to be removed from the pot it is only necessary to loosen the ribs $e$ from the upper hoop $d$, which ribs, Fig. 6, are then free to be swung down about the lower hoop $d$, when the tiles $a$ can be readily taken apart.

The ribs $e\ g$ and hoops $d$ and brace $f$ may be made of iron or any other suitable material. If made of iron or oxidizable metal, they should be galvanized to prevent rust.

The tiles $a$ and $c$ may be made of stone, cement, artificial stone, or any suitable material, and provided with any ornamental design. (See Fig. 1.)

If desired, the ribs $e$ may be omitted and the hoops $d$ be placed directly around the body of the vessel, as in barrels.

The advantages of these receptacles are greater durability, and when the proper material—as, for example, burnt clay—is used for the tiles the receptacles are porous, and the growth of the plants is thereby furthered. The receptacle can also readily be taken apart and the plant removed, which operation, in the case of large tubs heretofore in use, is very laborious. Furthermore, if any breakage of any of the tiles should occur, such broken parts are readily replaced without its being necessary to obtain an entirely new receptacle, thus avoiding expense.

What I claim as new, and desire to secure by Letters Patent, is—

1. As a new article of manufacture, a receptacle for plants and the like, the sides of which are formed of a double series of stone plates, tiles, or similar material, $a\ b$, and provided with ribs or hoops, of metal or other suitable material, for holding said plates or tiles in place, substantially as set forth.

2. As a new article of manufacture, a receptacle for plants and the like, the sides and bottom of which are formed of stone plates, tiles, or similar material, and provided with ribs $e$ and hoops $d$, the upper of said hoops being raised somewhat above the upper edge of the receptacle, so as to form a handle, substantially as set forth.

3. As a new article of manufacture, a receptacle for plants and the like, the sides and bottom of which are formed of stone plates, tiles, or similar material, and provided with ribs $e\,g$ and hoops $d$, substantially as set forth.

4. As a new article of manufacture, a receptacle for plants and the like, the sides and bottom of which are formed of stone plates, tiles, or similar material, and provided with ribs $e\,g$, hoops $d$, and brace $f$, substantially as set forth.

In testimony whereof I have hereunto set my hand and seal in the presence of two subscribing witnesses.

FREDERICK SANITER. [L. S.]

Witnesses:
HELMUTH DUEBERG,
BERTHOLD ROI.